N. C. BASSETT.
GOVERNOR.
APPLICATION FILED FEB. 23, 1907.
930,024.
Patented Aug. 3, 1909.
3 SHEETS—SHEET 1.
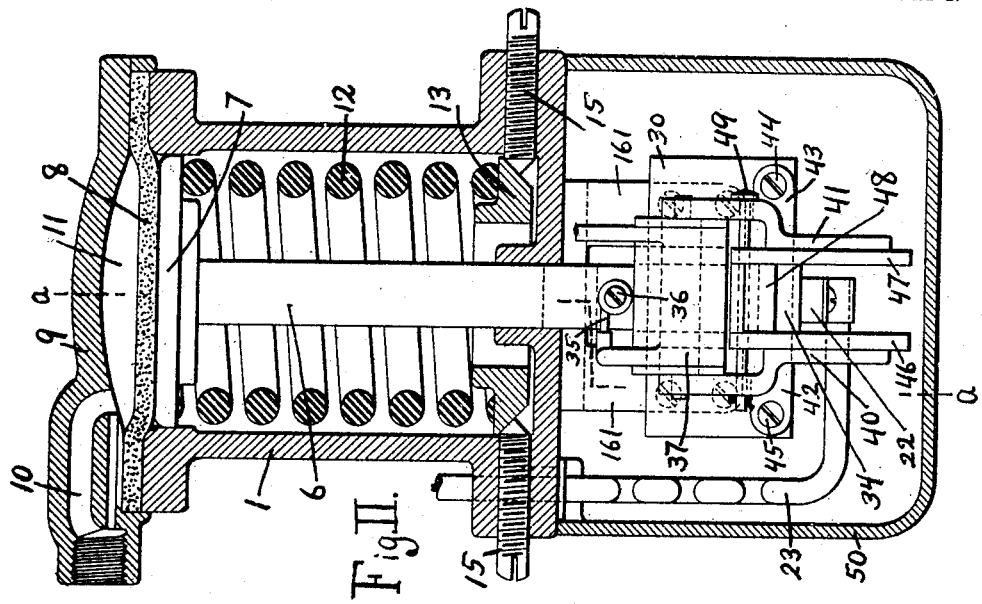
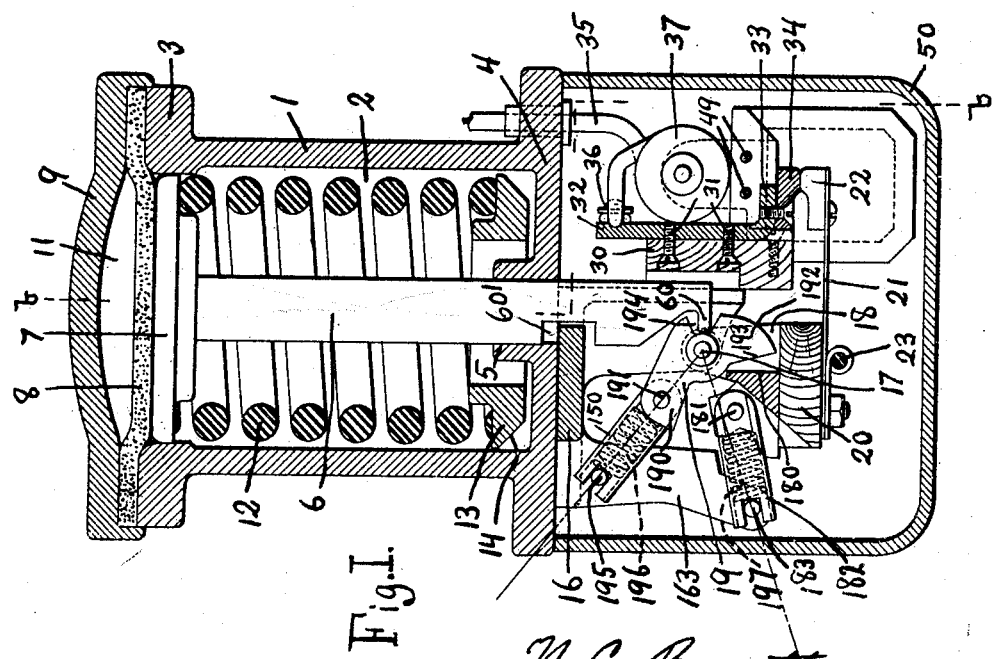
WITNESSES:
John C. Rennie
Frank E. Dennett
N. C. Bassett INVENTOR
BY
G. J. DeWein ATTORNEY.

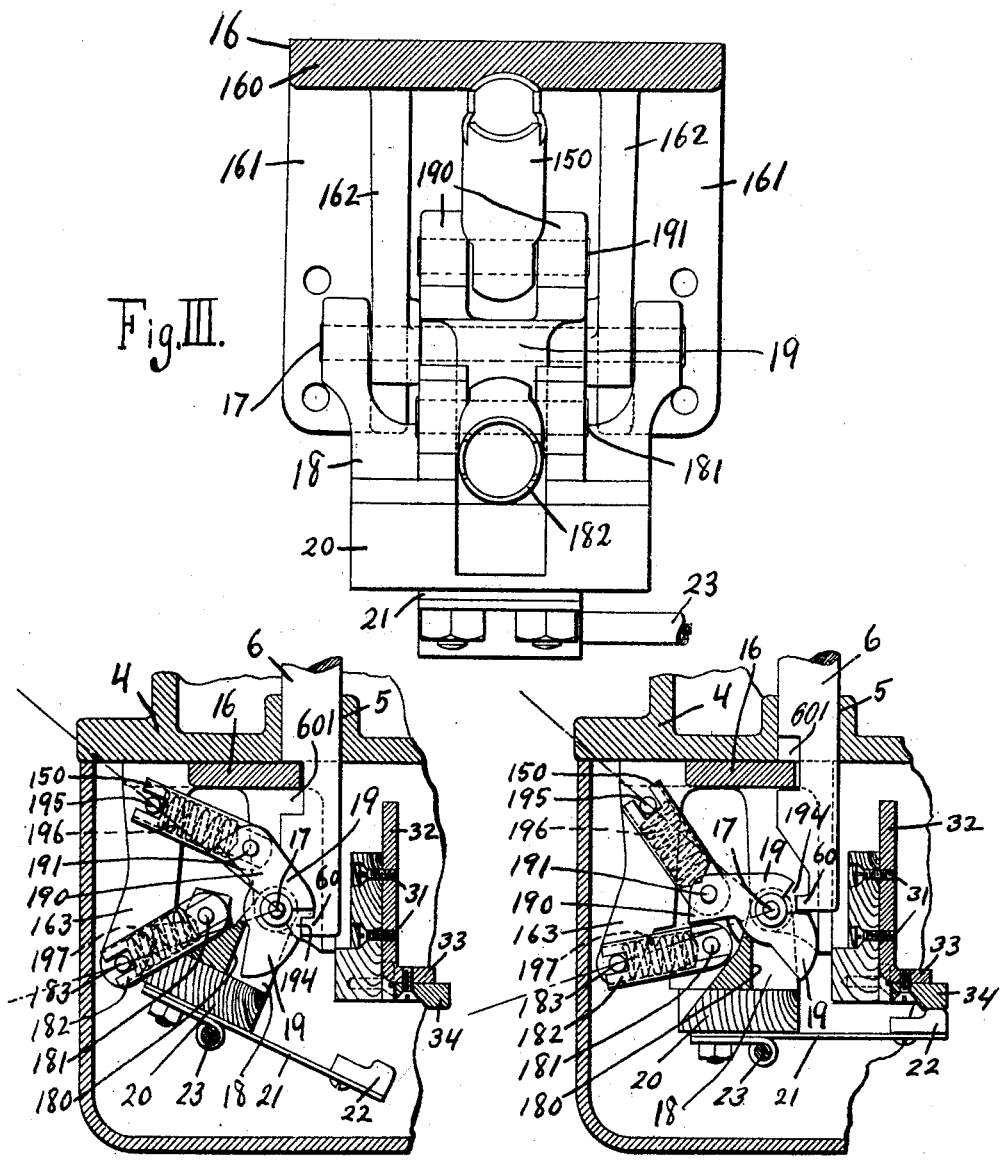

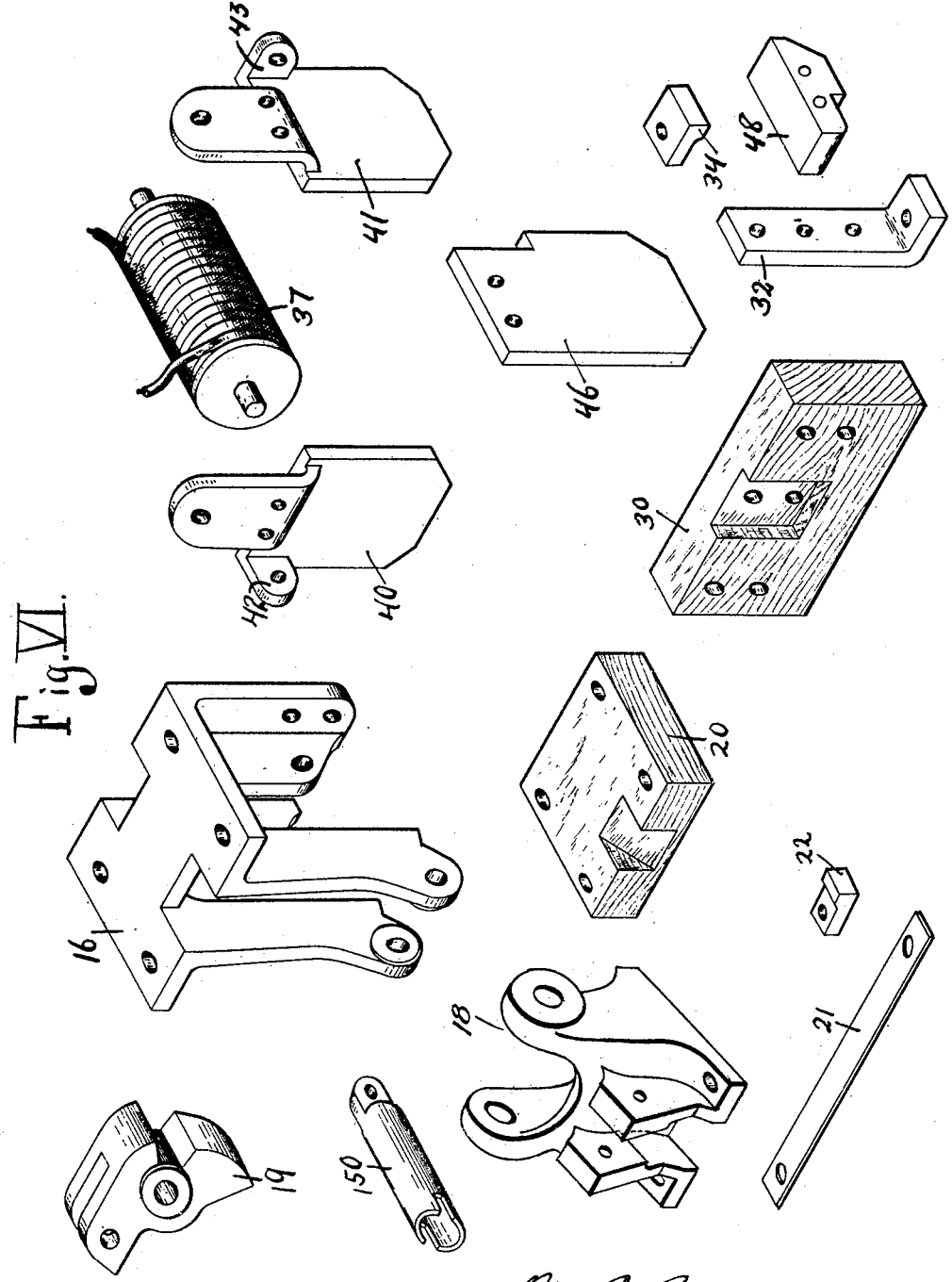

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

GOVERNOR.

No. 930,024.      Specification of Letters Patent.      Patented Aug. 3, 1909.

Application filed February 23, 1907. Serial No. 358,766.

*To all whom it may concern:*

Be it known that I, NORMAN C. BASSETT, a citizen of the United States, residing at Milwaukee, in the county of Milwaukee and State of Wisconsin, have invented a certain new and useful Governor, of which the following is a specification.

This invention relates to governors of that type in which an electric circuit which supplies electrical energy to a motor, is closed or broken according to the desired condition, and while this invention is adapted to any use where it is required to make or break electric circuit under any conditions which may be indicated by a movement of a prime actuating member, it is particularly useful for controlling the operation of an electric motor which actuates a pump or equivalent device for moving a fluid, and the apparatus disclosed by the drawings accompanying this specification discloses a specific embodiment of this invention especially adapted to be used in connection with air compressors driven by electric motors, the device shown and described being adapted to break an electric circuit through which the motor obtains its electrical energy when the pressure in an air receiver or storage tank reaches a predetermined maximum and to reëstablish said circuit when the pressure in said receiver or tank reaches a predetermined minimum.

The drawings which accompany this specification and form a part thereof illustrate a specific embodiment of this invention, the same reference characters being used to designate the same elements wherever they appear on each of the several figures, and the specific embodiment illustrated comprises a pressure responsive element which actuates a snap switch and means to hold the switch in either its open or closed position until it is snapped to its other position regardless of fluctuations in the air pressure between the predetermined limits, a magnet being provided to blow out the arc which may be established when the switch is opened.

The apparatus as shown by the drawings is adapted to be used in a vertical position with the switch and contacts immersed in oil, in which case there would be no appreciable arcing, the blow-out magnet assisting in preventing any arc being formed in the oil and thus prolonging the life of the oil by preventing carbonization of the oil.

On the drawings,—Figure 1 illustrates a section through the apparatus taken substantially on the line $a$—$a$, Fig. 2. Fig. 2 illustrates a section through the apparatus taken on the line $b$—$b$ on Fig. 1. Fig. 3 illustrates in detail a part of the mechanism. Fig. 4 illustrates the parts shown by Fig. 1 in the positions which they occupy when the switch is open. Fig. 5 illustrates the same parts in the positions which they occupy when the switch is closed. The parts as shown by Figs. 4 and 5 are shown by Fig. 1 in the position which they assume when the air pressure is rising and just before the switch will be snapped open. Fig. 6 illustrates in perspective some of the parts disassembled.

Referring to the drawings, the numeral 1 designates a casting which is preferably of cylindrical contour and provided with an internal cavity 2, an open flanged end 3, and a closed flanged end 4; said closed end being provided with an aperture 5 through which a rod 6 is adapted to extend, said rod 6 being either a diaphragm actuated rod, as shown by the drawings, or a piston actuated rod, or the equivalent.

The rod 6 is provided with a head 7 adapted to bear against the diaphragm 8, secured between the open flanged end of the cylinder 3 and a cap 9, which cap is provided with a passageway 10 to permit of the passage of a fluid under pressure to a chamber 11 formed between the cap 9 and the diaphragm 8.

The numeral 12 designates a spring of the open or compression type which bears against the head 7 and bears at its other end against a collar 13, which collar is provided with the beveled face 14 against which the conical ends of screws 15 bear, whereby the tension of the spring 12 can be readily adjusted.

The reference character 16 designates as a whole a casting which is provided with the members 160 and 161 disposed substantially at right angles to each other, webs 162 being provided at right angles to each of the before mentioned parts and preferably formed integral therewith; said member 160 being further provided with depending web members 163, preferably located in line with said web members 162. This member 16 is adapted to be secured to the closed end of said casting on the exterior thereof adjacent the aperture 5 therethrough. Supported by the webs 162 is a pin 17 upon which is pivoted the block 18 and the block 19. Block 18 has secured to it a piece of wood or other suitable insulating material 20, to which is secured an arm 21 which carries a switch or contact block 22, a conductor 23 being electrically connected with said arm 21. Secured to arms 190 of block 19 is a pin 191. On the opposite side of pivot pin 17 from arms 190 is an arm 192 provided with a face 193 which is adapted to contact with the face 180 formed on block 18. Block 19 is further provided with the notch 194 within which a projection 60 formed on the rod 6 is adapted to be received. Block 18 is further provided with the pin 181 to which is pivotally attached a hollow link 182, the opposite end of which is slotted and engages with the pin 183 secured to the webs 163. To pin 191 is pivoted a similarly formed link 150, which has its other end slotted and engaged with a pin 195, which is also secured to webs 163, and in said links and retained between pins 191 and 195, and 181 and 183, are spiral springs of the open or compression type 196 and 197.

The numeral 30 designates a block of wood or other suitable insulating material, which is secured to the members 161 of the member 16, as by being screwed thereto, as shown, or in any other suitable manner, and secured to said piece of wood by screws 31, the heads of which are countersunk into the wood, and the holes suitably plugged, is the brass strip 32 having one end bent over at substantially right angles with the body portion, as at 33, to which is secured the copper contact piece 34. To the other end of said brass strip 32 is secured the terminal of an electric conductor 35 by means of the screw 36.

In order to break the arc which may be formed when the switch is opened, a magnet 37 is provided by utilizing a part of the conductor 35 to form its helix. This magnet is so wound, as shown by Fig. 1 of the drawings, that the arc will be blown out toward the right, and in order to protect the apparatus from the heat of said arc, the following arrangement of the apparatus is adopted.

The numerals 40 and 41 designate the pole pieces of the magnet which are brought down opposite the switch, as clearly shown by Fig. 2 of the drawings, these pole pieces preferably being formed of sheet metal and having ears 42 and 43 turned out therefrom by which they and the magnet may be supported from the wooden block 30 by means of the screws 44 and 45.

The numerals 46 and 47 designate insulating and heat resisting plates, preferably two pieces of slate which are disposed one on either side of the contact members 22 and 34, and the numeral 48 designates a block of insulating and heat-resisting material, preferably soapstone, inserted between the two plates of slate, the plates of slate and soapstone block being supported by two brass rods 49 which pass through apertures therein and through apertures in the pole pieces 40 and 41, and may be provided with heads at one end, and openings to receive a cotter pin or the like in the other, which arrangement provides for the ready removal and replacing of these parts, whether for the purpose of inspection or repair.

The numeral 50 designates a cup casing, preferably made of thin brass, which may be secured to the head 4 in any suitable manner and is intended as a cover to protect the inclosed parts from dust and dirt; but if the governor is used in a vertical position, this may be used as a receptacle to contain oil to immerse the contact pieces, which is the preferred method of use, and the use of the apparatus in this way with oil in the casing 50 to cover the contact blocks will prevent any arc being established. The rod 6 is provided with a notch 601 within which projects a part of the casting 16 whereby a stop is provided to limit the extent of movement of said rod. The block 19, hollow link 150, spring 196, and the respective pins or pivots with which these parts coöperate, form in effect an energy storing device or toggle, this energy storing device or toggle being adapted to part with its energy and exert force to snap the switch open or closed, the blocks 22 and 34 and their electrical connections being designated by the term "switch." Such a device will store energy by moving to a neutral position where the energy stored is incapable of releasing itself because of the direction of its force, until released by being forced from its neutral position.

The use and operation of the apparatus are as follows: The chamber 11 being in communication with an air receiver, for example, the conductor 23 forming a part of a circuit which includes a source of electrical energy, and an electric motor which actuates an air pump for compressing air into said receptacle, the motor, air pump, air receptacle, etc., not being shown, with the block 22 contacting with the block 34, the apparatus being shown in this position by Figs. 1 and 5 of the drawings, electrical energy will be actuating the motor, air will be compressed, and as the pressure rises, the diaphragm 8 will be moved against the resistance of the spring 12, the projection 60 on the rod 6 will engage with the block 19, and, assuming that the apparatus stands in a vertical position as shown by Fig. 1, said block 19 will be rotated about the pivot pin 17, raising the arm 190 and pin 191, compressing the spring 196 until the pin 191 is in line with the pivot 17 and the pin 195, as shown by Fig. 1 of the drawings. Upon further downward movement of the rod 6, the pin 191 will be carried above the line joining pin 195 and pivot 17, the spring will be unresisted and will suddenly elongate, causing the face 193 on block 19 to contact with the face 180 on block 18, with the result that the block 18 is swung about the pivot 17, opening the switch by swinging block 22 away from block 34, and at the same time swinging pin 181 upwardly, thereby compressing spring 197, which is a weaker spring than spring 196, until pin 181 has passed above the line joining pin 183 and pivot 17, when the spring 197 being unresisted elongates, swinging block 18 about the pivot 17 to its extreme position. The face 193 of block 19, and the face 180 of block 18, may be arranged so that they will remain in contact when the switch is open, this construction, however, not being considered essential, as the spring 197 is of sufficient strength to hold the switch open and prevent any accidental closing thereof as the result of accidental shocks or jars. Should now the pressure fall in the receiver as the result of air being taken therefrom to operate the brakes, the pressure existing in the chamber will also fall, the spring 12 will force the diaphragm 8 up, the projection 60 will engage with the block 19, forcing the pin 191 and arm 190 downwardly, compressing the spring 196, the power of which is a great deal less than that of spring 12, until the pin 191 is again in line with the pin 195 and pivot 17, when upon any further upward movement of the diaphragm 8 and projection 60, the pin 191 will be moved below said line, the spring 196 being now unopposed will elongate, the arm 190 will strike the block 18 above the pin 181 and will force the block to rotate about the pivot 17 until block 22 contacts with block 34, when the switch will be closed, current will be supplied to the motor and the air pump will again be set into operation.

In the position of the parts when blocks 22 and 34 are in contact, the apparatus is so proportioned that the arm 190 is held by spring 196 in contact with block 18, thereby adding its force to that of spring 197 for the purpose of maintaining the blocks 22 and 34 firmly in contact so that both springs act to lock the switch closed.

What I claim is,—

The combination with a member adapted to be vibrated to two extreme positions, of a toggle for holding said member in either of said extreme positions, a toggle for actuating said member, and spring means for flexing said toggles.

In testimony whereof, I affix my signature in the presence of two witnesses.

NORMAN C. BASSETT.

Witnesses:
H. C. CASE,
FRANK E. DENNETT.